United States Patent
Kim (10) Patent No.: US 8,826,381 B2
(45) Date of Patent: Sep. 2, 2014

(54) NODE DEVICE AND METHOD TO PREVENT OVERFLOW OF PENDING INTEREST TABLE IN NAME BASED NETWORK SYSTEM

(75) Inventor: Dae Youb Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 13/489,619

(22) Filed: Jun. 6, 2012

(65) Prior Publication Data
US 2012/0317616 A1      Dec. 13, 2012

(30) Foreign Application Priority Data
Jun. 9, 2011    (KR) .................. 10-2011-0055481

(51) Int. Cl.
*G06F 15/177*     (2006.01)
*H04L 29/06*      (2006.01)

(52) U.S. Cl.
CPC ........ *H04L 63/1425* (2013.01); *H04L 63/1458* (2013.01)
USPC ............................... 726/3; 726/22

(58) Field of Classification Search
CPC ................... H04L 63/1458; H04L 63/1425
USPC .......................................... 726/3, 22
See application file for complete search history.

(56) References Cited

U.S. PATENT DOCUMENTS

| | | | |
|---|---|---|---|
| 7,707,305 | B2 | 4/2010 | Afek et al. |
| 8,204,060 | B2 * | 6/2012 | Jacobson et al. ............. 370/392 |
| 2006/0230444 | A1 | 10/2006 | Iloglu et al. |
| 2010/0195655 | A1 * | 8/2010 | Jacobson et al. ............. 370/392 |
| 2011/0280214 | A1 * | 11/2011 | Lee et al. .................... 370/331 |
| 2012/0317613 | A1 * | 12/2012 | Kim et al. ....................... 726/1 |
| 2012/0317616 | A1 * | 12/2012 | Kim ............................... 726/3 |
| 2012/0317643 | A1 * | 12/2012 | Kim .............................. 726/22 |

FOREIGN PATENT DOCUMENTS

| | | | |
|---|---|---|---|
| JP | 2006-050442 | A | 2/2006 |
| KR | 10-2003-0009887 | A | 2/2003 |
| KR | 10-0479202 | B1 | 3/2005 |
| KR | 10-2005-0066048 | A | 6/2005 |
| KR | 10-2010-0025796 | A | 3/2010 |

OTHER PUBLICATIONS

European Search Report issued Dec. 18, 2012 in counterpart European Patent Application No. 12169768.4-1244/2533492 (7 pages, in English).

Suh, Junho et al. "Implementation of Content-oriented Networking Architecture (CONA): A Focus on DDoS Countermeasure," School of Computer Science and Engineering, Seoul National University, XP-002688336 (5 pages, in English) Sep. 2010.

Zhang, Lixia et al. "Named Data Networking (NDN) Project," NDN, Technical Report NDN-0001, Oct. 2010 http://named-data.net/techreports.html XP-002687393 (26 pages, in English).

* cited by examiner

*Primary Examiner* — Haresh N Patel
(74) *Attorney, Agent, or Firm* — NSIP Law (57) ABSTRACT

A node device and method are described to prevent overflow of a pending interest table (PIT). When excessive request messages are received through a particular interface, the node device and method transmits a traffic control message to control a transmission interval of the request messages, which are transmitted to a corresponding interface.

13 Claims, 7 Drawing Sheets

| PIT | |
|---|---|
| NAME | INTERFACE |
| /samsung.com/sait/kyd.jpg | 2 |
| /samsung.com/dmc/file.doc | n |
| /dongA.com/paper/20101223.txt | 1 |
| **** | |
| /samsung.com/sait/secu.icon | 3 |

NODE DEVICE AND METHOD TO PREVENT OVERFLOW OF PENDING INTEREST TABLE IN NAME BASED NETWORK SYSTEM

CROSS-REFERENCE TO RELATED APPLICATION(S)

This application claims the benefit under 35 U.S.C. §119(a) of Korean Patent Application No. 10-2011-0055481, filed on Jun. 9, 2011, in the Korean Intellectual Property Office, the entire disclosure of which is incorporated herein by reference.

BACKGROUND

1. Field

The following description includes an apparatus and a method routing using a node device in a name based network system.

2. Description of Related Art

In a network routing technology, in name based networking such as content centric network/named data network (CCN/NDN), in response to a request message, a location of a target place needs to be known to be able to transmit a response message to be processed. In the name based network, the request message may also be called a request, an interest, or a data request. Also, the response message may be called a response or data.

A pending interest table (PIT) refers to a table that stores a list of received request messages. That is, when a request message is received, a corresponding node device records a traffic path along with information on the request message in the PIT. Upon transmission of a corresponding response message, the corresponding node device retransmits the corresponding response message through the traffic path of the request message stored in the PIT.

However, the PIT may be a target of a distributed denial of service (DDoS) attack. That is, when a quantity of request messages is received, exceeding the storage capacity of the PIT of the node device, the node device has to delete part of the request messages prior to storing or discard newly received request messages. Regardless of which method is selected, the DDoS attack will eventually be successful because the node device is hindered from normally processing the request messages.

A general Internet protocol (IP) router does not require management of a traffic history. Therefore, a DDos attack scenario as described in the foregoing is not applicable to the IP router. However, in networks such as the CCN/NDN where devices are not identified, the PIT functions as essential information for the networks. Thus, the node device corresponding to the router in the name based network system is vulnerable to the DDos attack.

SUMMARY

In accordance with an illustrative example, a node device includes an attack detection unit configured to count a number of request messages received at interface units during a period of time and configured to detect an interface unit receiving the request messages, wherein the number of request messages received exceeds a threshold. The node device also includes a traffic control request unit configured to transmit a traffic control message to the detected interface unit. The traffic control message requests a transmission interval of the request messages.

In accordance with another illustrative example, a node device, including an interface unit configured to transmit a request message and receive a traffic control message. The node device also includes an authentication unit configured to authenticate the traffic control message using authentication information in the traffic control message. The node device includes a setup change unit configured to check a transmission interval in the traffic control message when the traffic control message is authenticated, and configured to setup the checked transmission interval as a transmission interval of the request message.

In accordance with a further illustrative example, a method of preventing overflow of a pending interest table (PIT) in a node device includes counting a number of the request messages received by interface units and detecting an interface unit receiving the request messages during a period of time, wherein the number of request messages exceeds a threshold. The method also includes transmitting a traffic control message to the detected interface unit. The traffic control message requests a transmission interval of the request messages.

In accordance with another illustrative example, a method to prevent overflow of a pending interest table (PIT) in a node device includes receiving a traffic control message at an interface unit, and authenticating the traffic control message using authentication information in the traffic control message. The method also includes checking a transmission interval in the traffic control message when authentication of the traffic control message succeeds, and setting the checked transmission interval as a transmission interval of the request message transmitted by the interface unit that received the traffic control message.

In accordance with an alternative illustrative example, a computer program embodied on a non-transitory computer readable medium is configured to control a processor to perform the method of preventing overflow of a pending interest table (PIT) in a node device. The computer program is configured to control a processor to perform the method of counting a number of the request messages received by interface units and detecting an interface unit receiving the request messages during a period of time, wherein the number of request messages exceeds a threshold. The computer program is configured to control a processor to perform the method of transmitting a traffic control message to the detected interface unit. The traffic control message requests a transmission interval of the request messages.

In accordance with an alternative illustrative example, a computer program embodied on a non-transitory computer readable medium is configured to control a processor to perform the method of preventing overflow of a pending interest table (PIT) in a node device. The method includes receiving a traffic control message at an interface unit, and authenticating the traffic control message using authentication information in the traffic control message. The computer program is configured to control a processor to perform the method of checking a transmission interval in the traffic control message when authentication of the traffic control message succeeds, and setting the checked transmission interval as a transmission interval of the request message transmitted by the interface unit that received the traffic control message.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Figure 5:
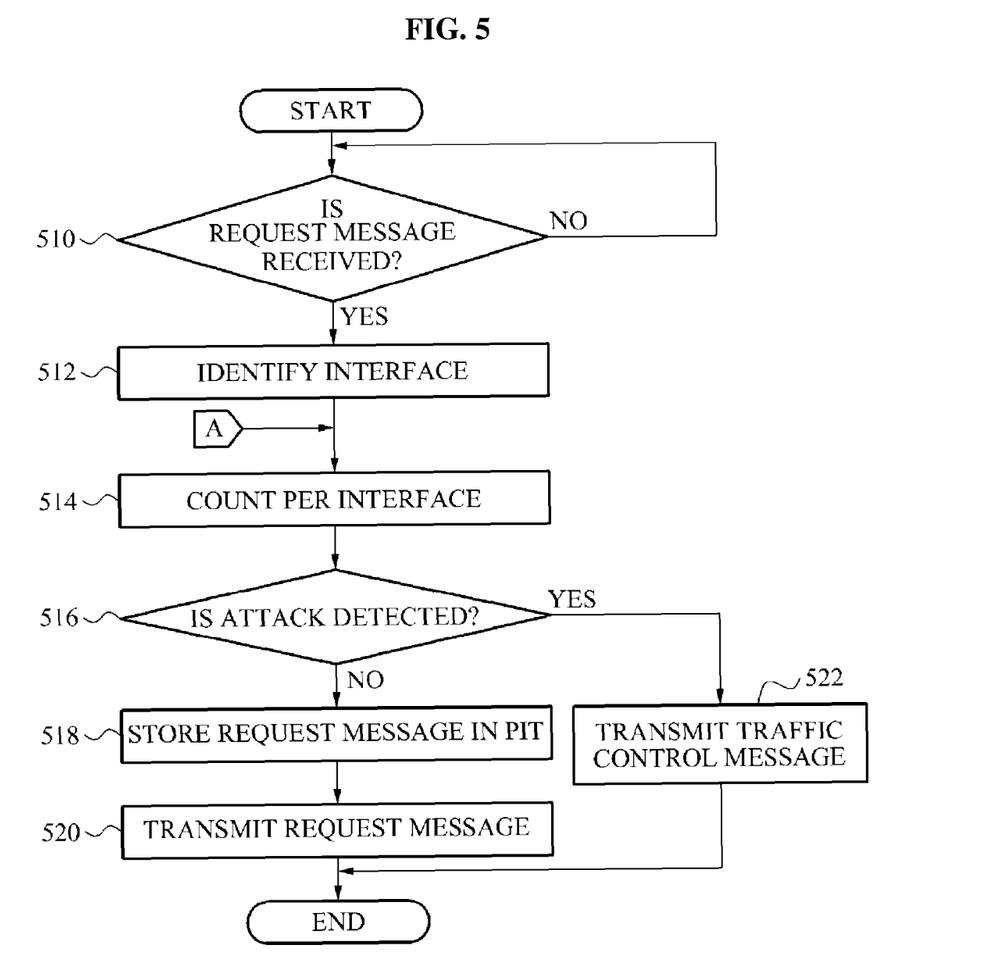
FIG. 5 is a flowchart illustrating a method or a process of detecting and processing an attack to prevent overflow of the PIT in a node device, according to example embodiments.
Figure 6:
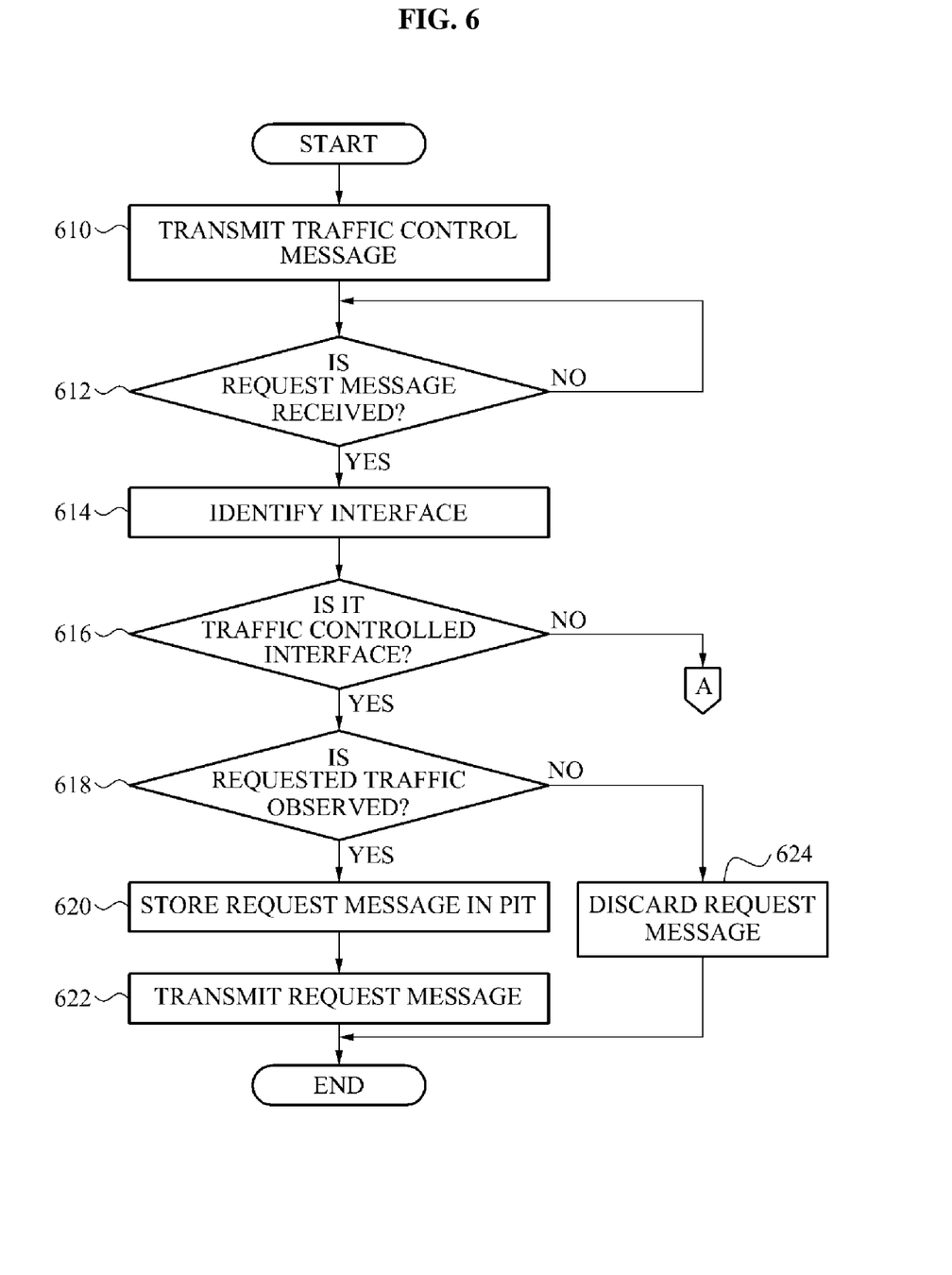
FIG. 6 is a flowchart illustrating a method or a process of dealing with an attack to prevent overflow of the PIT in the node device, according to example embodiments.
Figure 7:
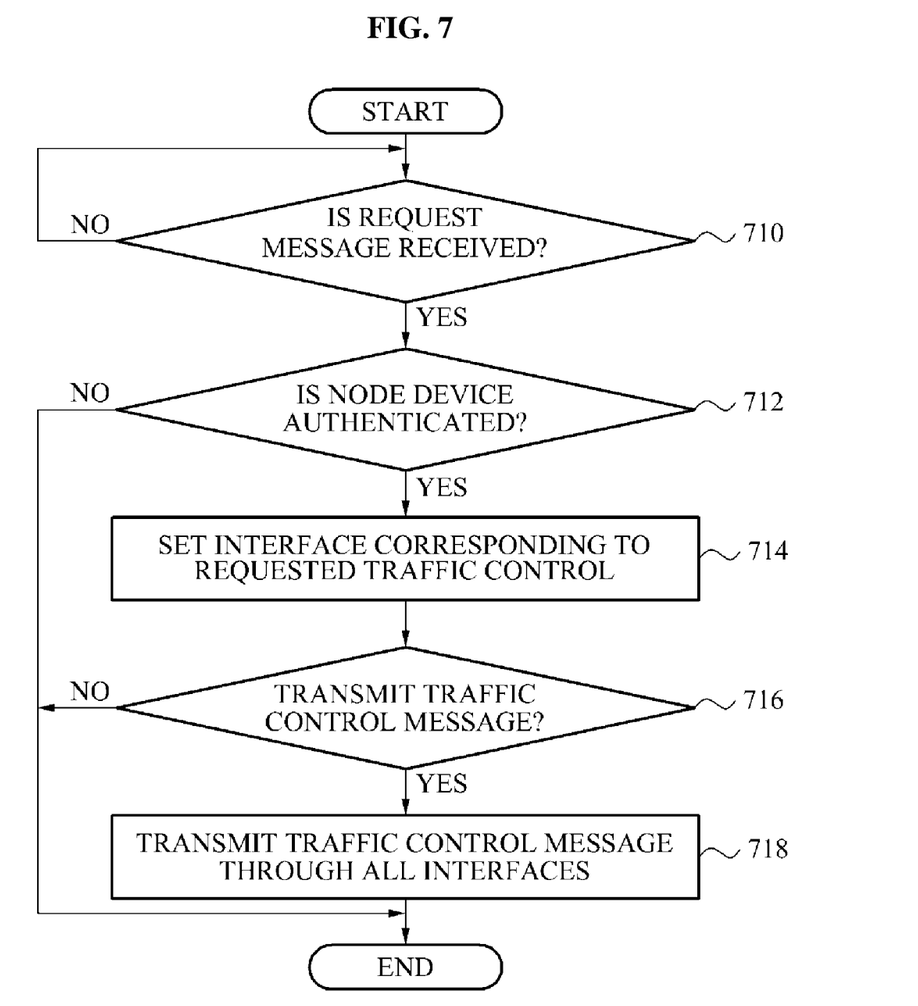
FIG. 7 is a flowchart illustrating a method or a process of processing transmission control by request to prevent overflow of the PIT in the node device, according to example embodiments.

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example. The sequence of steps and/or operations to be described for FIGS. 5-7 is not limited to that set forth herein and may be changed as is known in the art, with the exception of steps and/or operations necessarily occurring in a certain order. Also, description of well-known functions and constructions may be omitted for increased clarity and conciseness.

According to some embodiments described below, when request messages of more than a predetermined threshold are received from a particular interface, a node device and a method may transmit a traffic control message to control a transmission interval of the request messages that are transmitted to a corresponding interface. Thus, traffic of the request messages is controlled by the traffic control message. Accordingly, overflow of a pending interest table (PIT) may be prevented.

Figure 1:
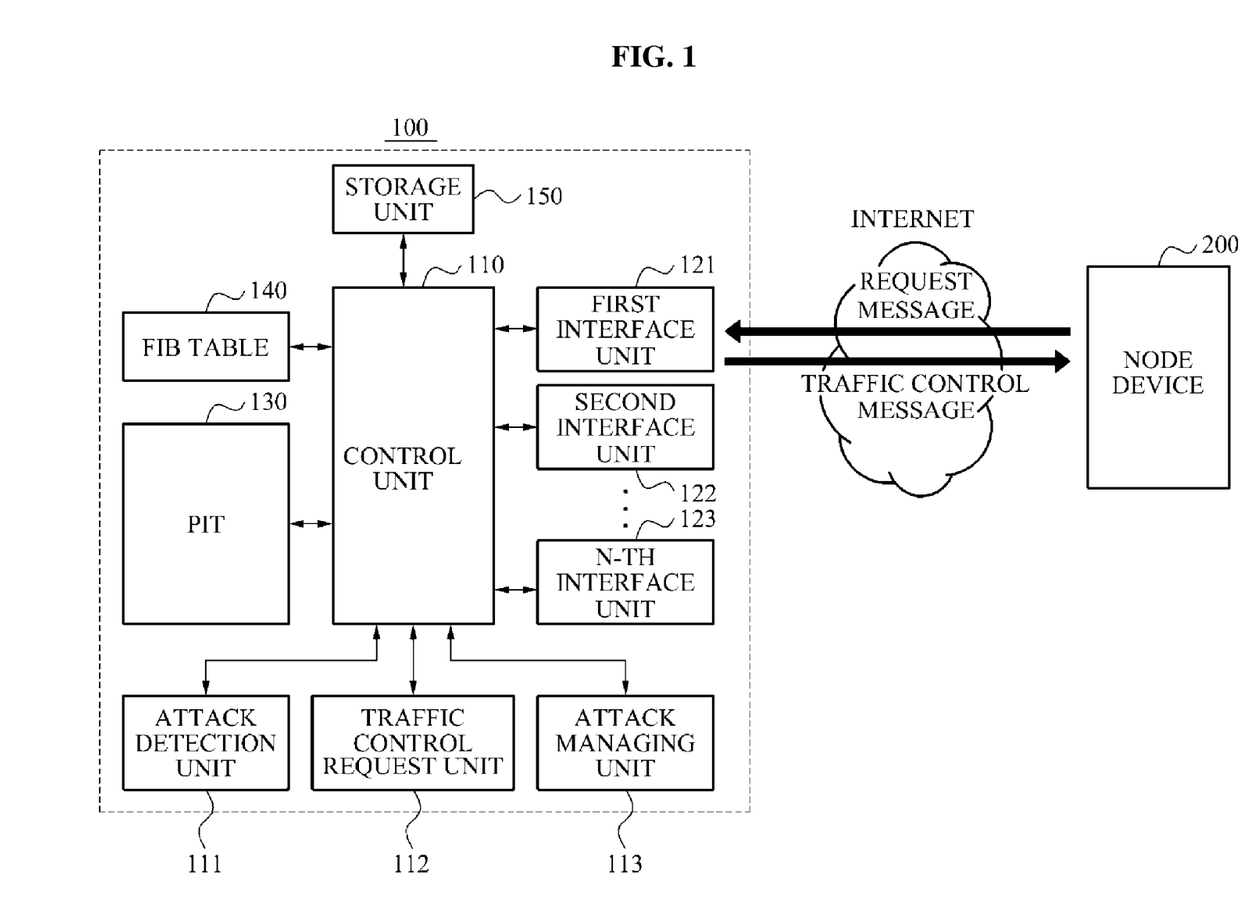
FIG. 1 is a diagram illustrating a structure of a node device preventing overflow of a pending interest table (PIT), according to example embodiments.

FIG. 1 illustrates an example of a structure of a node device 100 preventing overflow of a pending interest table (PIT), according to example embodiments.

Referring to FIG. 1, the node device 100 may include a control unit 110, an attack detection unit 111, a traffic control request unit 112, an attack managing unit 113, a plurality of interface units, for example, interface units 121, 122, and 123, a PIT 130, a forwarding information base (FIB) table 140, and a storage unit 150.

Figure 2:
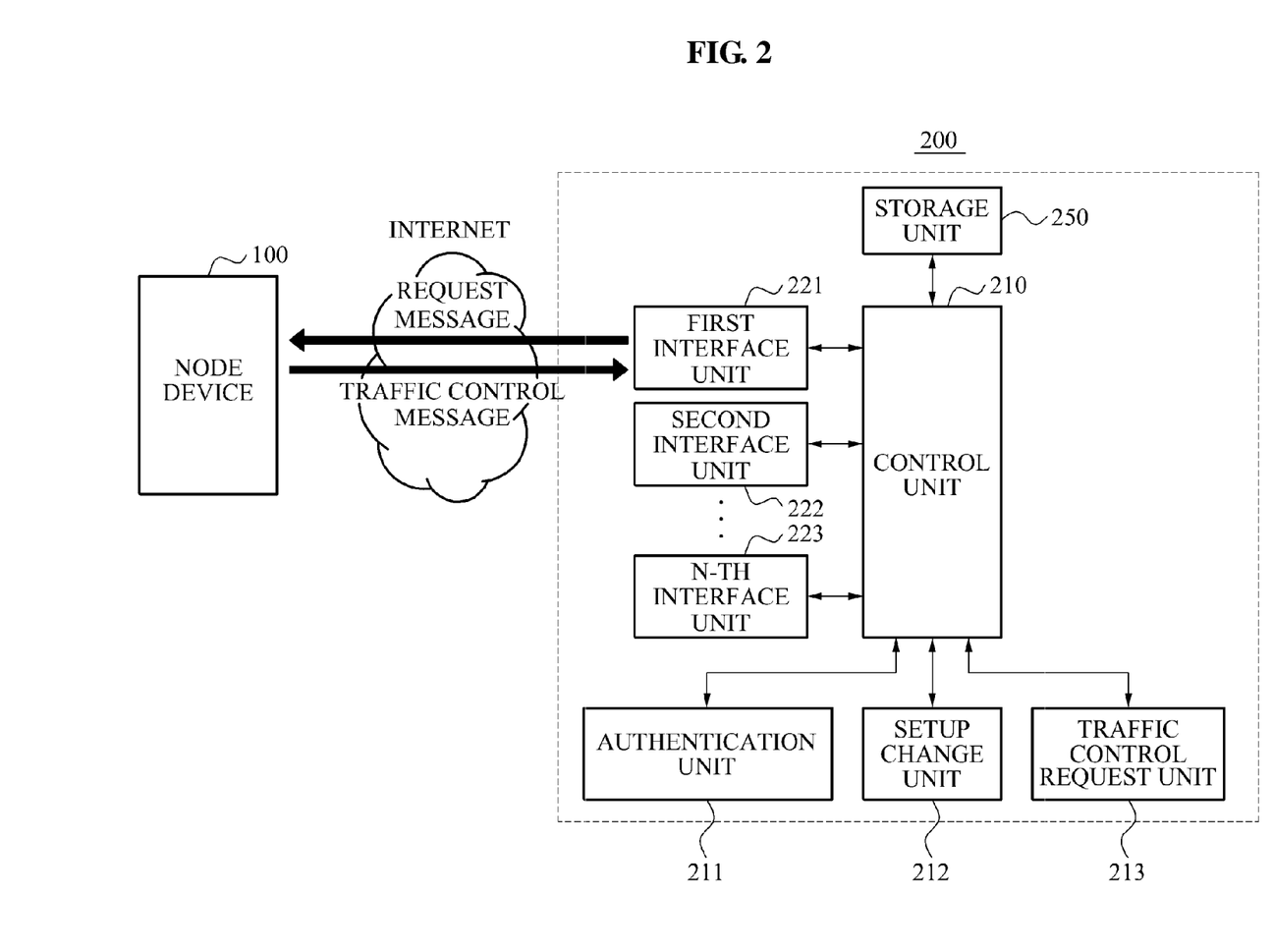
FIG. 2 is a diagram illustrating a structure of a node device that processes transmission control by request to prevent overflow of the PIT, according to example embodiments.

The control unit 110 controls the interface units 121, 122, and 123 to receive request messages from the node device 100 and transmit the received request messages to an adjacent node device 200, as shown in FIG. 2 and to be later described. Also, the control unit 110 controls the interface units 121, 122, and 123, which may transmit a traffic control message to the node device 100.

The interface units 121, 122, and 123 may be logical, that is, virtual interfaces, or physical interfaces.

The PIT 130 may store the request messages received from the interface units 121, 122, and 123. In one example, the PIT 130 may store the request messages simultaneously as they are received from the interface units 121, 122, and 123. In the alternative, the PIT 130 may store the request messages, one at a time, in an order as they are received. In another example, the PIT 130 may store the request messages at a preset order or priority order as defined by order information carried by each request message.

Figure 3:
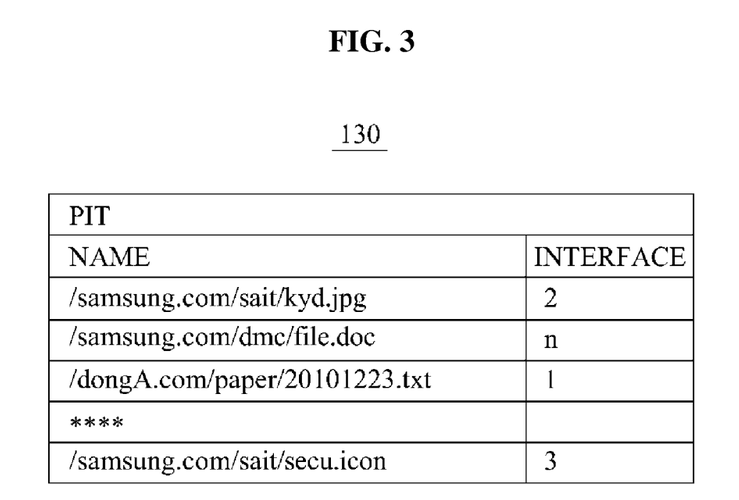
FIG. 3 is a diagram illustrating a structure of the PIT, according to example embodiments.

FIG. 2 is a diagram illustrating a structure of a node device that processes transmission control by request to prevent overflow of the PIT, according to example embodiments, to be later described. FIG. 3 illustrates an example of a structure of the PIT, according to example embodiments.

Referring to FIG. 3, the PIT 130 may store names of the request messages along with interface information. The interface information may include, but is not limited to, information on an interface unit that received the request messages. As previously explained, the PIT 130 may also store information associated with a priority order defining an order of importance associated with the particular request message, an order in which the request message is to be processed.

Returning to FIG. 1, the FIB table 140 may store names of the request message and corresponding interface information.

The storage unit 150 may store an operation system and an application program for controlling the overall operation of the node device 100. In addition, the storage unit 150 may also store authentication information of the node device 100 for authentication of the node device 100.

When receiving the request messages through the interface units 121, 122, and 123, the control unit 110 controls the PIT 130 to store the request messages. In addition, the control unit 110 searches for a name that has a high or a close similarity with each request message from the FIB table 140, checks the interface units 121, 122, and 123 to determine the an interface unit 121, 122, or 123 that corresponds to the searched name. Furthermore, the control unit 110 controls so that the received request message is transmitted through the interface unit checked by the FIB table 140.

The attack detection unit 111 counts a number of the request messages received through the respective interface units 121, 122, and 123, and detects the interface unit receiving the request messages, the number of which during a predetermined period of time exceeds a predetermined threshold. For example, a value range of the predetermined period of time is 30 seconds to 1 minute. In addition, in one example, the predetermined threshold is 1000.

The traffic control request unit 112 transmits the traffic control message to the interface unit detected by the attack detection unit 111. The traffic control message may request control of a transmission interval of the request messages. For example, the traffic control message contains authentication information to identify and authenticate the node device 100. The traffic control message may further contain at least one of hop number information, maintenance time information, and transmission interval information. In one example, the hop number information indicates a number of hops to transmit the traffic control message. The maintenance time information indicates time during which the traffic control by the traffic control message is maintained. The transmission interval information indicates a transmission interval of the request messages.

After the traffic control request unit 112 transmits the traffic control message, the request messages are received through the interface unit where the attack is detected. At this instance, at a transmission interval less than a transmission interval set by the traffic control message, the attack managing unit 113 discards the request messages received at the transmission interval less than the set transmission interval. For example, the attack managing unit 113 discards the request messages received at a transmission level outside the transmission interval set through the interface unit. In accordance with an illustrative example, outside the transmission interval may be defined as before or after the transmission interval set through the interface unit.

The traffic control request unit 112 then transmits the traffic control message to all of the interface units 121, 122, and 123. In this instant, the attack managing unit 113 may discard the request messages received at a transmission interval less than the transmission intervals requested by the interface units 121, 122, and 123.

The control unit 110 also controls the overall operation of the node device 100. In addition, the control unit 110 may be further configured to perform functions of the attack detection unit 111, the traffic control request unit 112, and the attack managing unit 113, although the aforementioned parts are separately illustrated in the drawings for a distinctive description. That is, the control unit 110 may include at least one processor configured to perform the functions of the attack detection unit 111, the traffic control request unit 112, and the attack managing unit 113. In addition, the control unit 110 may include at least one processor configured to perform part of the functions of the attack detection unit 111, the traffic control request unit 112, and the attack managing unit 113.

Figure 4:
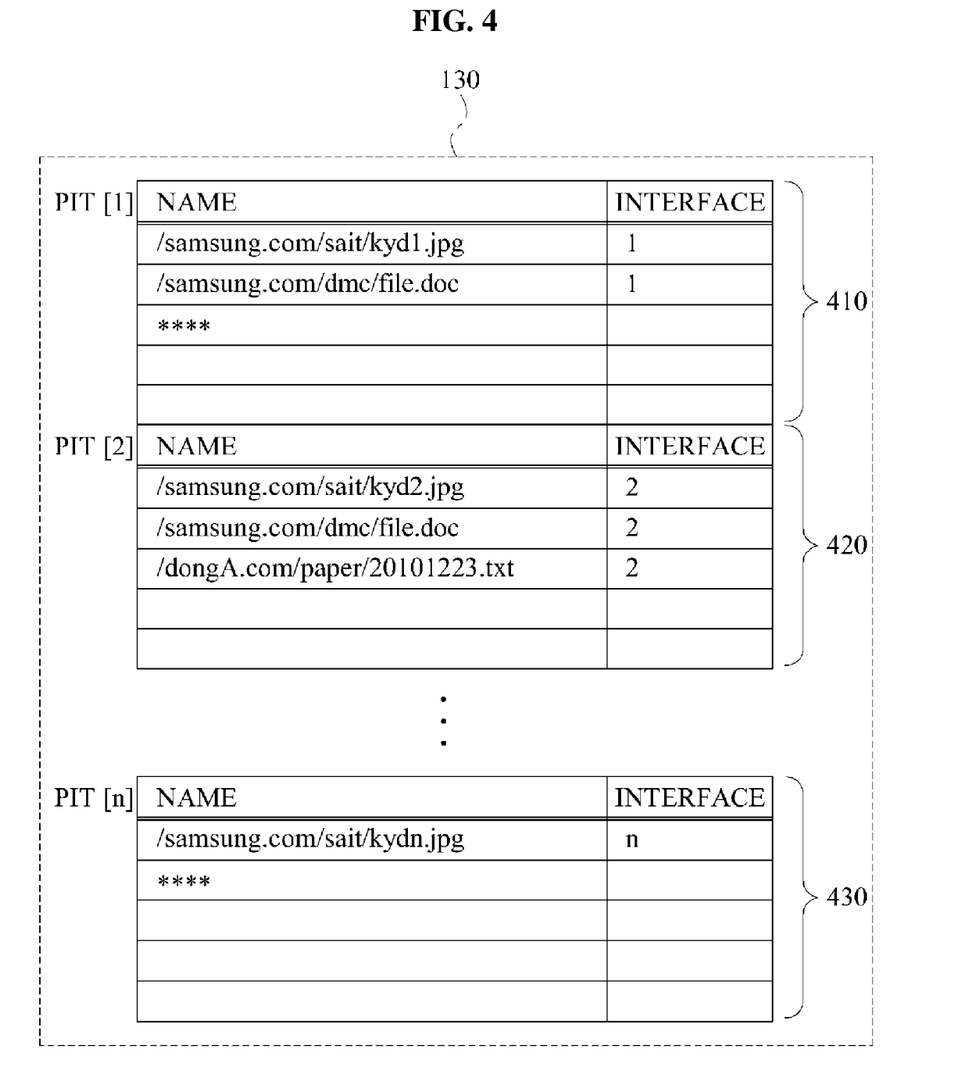
FIG. 4 is a diagram illustrating a structure of a plurality of divided PITs, according to example embodiments.

FIG. 4 illustrates an example of a structure of the PIT 130 divided into a plurality of PITs, according to example embodiments.

Referring to FIG. 4, the PIT 130 includes tables 410, 420, and 430. Each table 410, 420, and 430 correspond to or match the interface units 121, 122, and 123, respectively.

In the case where the PIT 130 includes the plurality of tables 410, 420, and 430, when the request messages are received through one of the interface units 121, 122, and 123, the control unit 110 identifies the interface unit that received the request messages, checks the table 410, 420, or 430 corresponding to the identified interface unit 121, 122, or 123, and controls the checked table 410, 420, or 430 to store the request messages.

In one example, the plurality of tables 410, 420, and 430 include the same capacity. In the alternative, the plurality of tables 410, 420, and 430 may include different capacities from each other. The capacities of the plurality of tables 410, 420, and 430 may be set in consideration of traffic flowing into the corresponding matching interface units 121, 122, and 123. Furthermore, in an example, the plurality of tables 410, 420, and 430 are physically different tables. In an example, at least one of the tables 410, 420, and 430 is a logical table or a virtually divided table.

Referring to FIG. 2, as previously explained, the structure of the node device 200 that processes transmission control to prevent overflow of the PIT, according to example embodiments. The node device 200 includes a control unit 210, an authentication unit 211, a setup change unit 212, a traffic control request unit 213, a plurality of interface units, for example, interface units 221, 222, and 223, and a storage unit 250.

The control unit 210 controls the interface units 221, 222, and 223 to receive a traffic control message from the node device 200 and transmit the received request messages to the node device 100 of FIG. 1. The control unit 210 controls the interface units 221, 222, and 223 to transmit received request messages to the node device 200.

The interface units 221, 222, and 223 may be logical or a virtual interfaces or physical interfaces.

The storage unit 250 stores an operation system and an application program to control the overall operation of the node device 200 through the control unit 210. In addition, the storage unit 250 may also store authentication information to authenticate the adjacent node device 100 and authentication information to authenticate the node device 200.

The authentication unit 211 determines and authenticates or verifies whether the traffic control message is received from the adjacent node device 100 using authentication information contained in the traffic control message.

When the authentication unit 211 successfully authenticates the traffic control message, the setup change unit 212 checks the transmission interval contained in the traffic control message. The setup change unit 212 sets the checked transmission interval as a transmission interval of the request messages transmitted by the interface unit that received the traffic control message.

In addition, the setup change unit 212 checks a maintenance time contained in the traffic control message. The setup change unit 212 also maintains the changed setup for the maintenance time. In one example, a sample range of the maintenance time includes 30 seconds to 1 minute. In an example, the traffic control message may not contain information on the transmission interval or the maintenance time. In this case, the setup change unit 212 sets a predetermined transmission interval as the transmission interval of the request message, and maintains the setup for a predetermined maintenance time. In one example, a sample range of the predetermined transmission interval is 30 seconds. In an example, the predetermined maintenance time is 1 minute.

The traffic control request unit 213 may check a number of hops contained in the traffic control message. When the number of hops is equal to or greater than 1, the traffic control request unit 213 generates a second traffic control message containing the authentication information to authenticate the node device 200. The traffic control request unit 213 transmits the second traffic control message to all of the interface units 221, 222, and 223, except to the interface unit that received the traffic control message. The second traffic control message may include at least one of the maintenance information and the transmission interval information.

In one illustrative example of a configuration, the control unit 210 controls the overall operation of the node device 200. The control unit 210 may perform functions of the authentication unit 211, the setup change unit 212, and the traffic control request unit 213 although those parts are separately illustrated in the drawing for a distinctive description. Therefore, the control unit 210 may include at least one processor configured to perform the functions of the authentication unit 211, the setup change unit 212, and the traffic control request unit 213. In addition, the control unit 210 may include at least one processor configured to perform part of the functions of the authentication unit 211, the setup change unit 212, and the traffic control request unit 213.

Hereinafter, a method for preventing overflow of a PIT in the above configured node device in a name based network system will be described with reference to the drawings.

FIG. 5 illustrates a flowchart of a method or a process to detect and process an attack to prevent overflow of the PIT in a node device, according to example embodiments. The node device may include the node device 100 or the node device 200, or both.

Referring to FIG. 5, at 510, the method of the node device determines whether a request message is received. At 512, when the request message is received, the method identifies an interface unit that received the request messages.

In 514, the method counts a number of the request messages received per interface unit.

In 516, the method determines whether an attack is detected based on the number of the request messages received during a predetermined period of time. When the number of the request messages received during the predetermined period of time does not exceed the predetermined threshold, at 518, the method stores the received request messages in the PIT.

In addition, in 520, the method searches for a name having a high or close similarity with each received request message stored in the FIB table, checks an interface unit corresponding to the searched name, and transmits the received request message through the checked interface unit.

In the alternative, when the number of the request messages received during the predetermined period of time exceeds the predetermined threshold, at 522, the method transmits a traffic control message to the corresponding interface unit. In one example, the traffic control message requests control of the transmission interval of the request message. The traffic control message includes authentication information to identify and authenticate the node device. In addition, the traffic control message further includes at least one of hop number information, maintenance time information, and transmission interval information.

FIG. 6 illustrates a flowchart of a method or a process of dealing with an attack to prevent overflow of the PIT in the node device, according to example embodiments.

Referring to FIG. 6, at 610, the method of the node device transmits a traffic control message. At 612, the method determines whether the request message or request messages are received. When the request messages are received, at 614, the method of the node device identifies an interface unit that receives the request messages.

In 616, the method checks whether the identified interface unit is a traffic-controlled interface unit. When the identified interface unit is not the traffic-controlled interface unit as a result of 616, operation 514 of FIG. 5 is performed (as shown in FIGS. 5 and 6 as "A"). When the identified interface unit is the traffic-controlled interface unit, at 618, the method determines whether the traffic requested by the traffic control message is observed. In one instant, the node device determines that the requested traffic is not observed, when the request messages are received at a transmission interval less than a transmission interval requested by the interface unit that received the traffic control message.

When the method determines that the traffic is observed, at 620, the method stores the received request messages in the PIT. In addition, in 622, the method searches for a name having a high similarity with each received request message from an FIB table, checks an interface unit corresponding to the searched name, and transmits the received request message through the checked interface unit.

At 618, when the method determines that the traffic is not observed, at 624, the method of the node device discards the request messages received at a transmission interval outside the requested transmission interval.

FIG. 7 illustrates a flowchart of a method or a process of processing transmission control by request to prevent overflow of the PIT in the node device, according to example embodiments.

Referring to FIG. 7, at 710, the method determines whether a traffic control message is received. When the traffic control message is received, at 712, the method of the node device authenticates whether the traffic control message is duly received from an adjacent node device using authentication information contained in the traffic control message.

When the traffic control message is successfully authenticated, in 714, the method checks a transmission interval and a maintenance time contained in the traffic control message. The method also sets the checked transmission interval as a transmission interval of a request message transmitted by an interface unit that received the traffic control message. The method further maintains the changed setup for the maintenance time. In one illustrative example, the traffic control message may not contain information on the transmission interval or the maintenance time. In this case, the method sets a predetermined transmission interval as the transmission interval of the request message and maintains the setup for a predetermined maintenance time.

In addition, in 716, the method determines whether to transmit the traffic control message to another adjacent node device. In one example, the method checks a number of hops contained in the traffic control message, and transmits the traffic control message to the other adjacent node device when the number of hops is greater than or equal to 1.

As a result of 716, the method generates and transmits a second traffic control message including authentication information of the node device to all interface units, except to the interface unit that received the traffic control message. In one example, the second traffic control message includes a value obtained by subtracting 1 from the number of hops to be a new number of hops. In addition, the second traffic control message may further include at least one of maintenance time information and transmission interval information.

When the authentication fails at 712 or when the traffic control message is not to be transmitted at 716, the method terminates.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A node device, comprising:
an attack detection unit configured to count a number of request messages received at interface units of the node device during a period of time, and detect an interface unit receiving the request messages among the interface units in response to the number of request messages received exceeding a threshold;
a traffic control request unit configured to transmit a traffic control message to the detected interface unit, the traffic control message requesting a transmission interval of the request messages; and
an attack managing unit configured to discard request messages received at a transmission interval outside a transmission interval requested by the detected interface unit, when the request messages are received at a transmission interval less than the requested transmission interval and after the response message is transmitted to the detected interface unit.

2. The node device of claim 1, further comprising:
a pending interest table (PIT) configured to store the request messages.

3. The node device of claim 1, wherein the traffic control message includes authentication information to identify and authenticate the node device.

4. The node device of claim 3, wherein the traffic control message further comprises at least one of:
hop number information comprising a number of node devices transmitting the traffic control messages;
maintenance time information comprising time during which traffic control by the traffic control message is maintained; and
transmission interval information comprising the transmission interval of the request messages.

5. The node device of claim 1, further comprising:
an attack managing unit configured to discard request messages received at a transmission interval outside a transmission interval requested by the detected interface unit, when the request messages are received at a transmission interval less than the requested transmission interval, after the traffic control message is transmitted.

6. The node device of claim 1, wherein the traffic control request unit is configured to transmit the traffic control message to the interface units.

7. The node device of claim 6, further comprising:
an attack managing unit configured to discard request messages received at a transmission interval outside a transmission interval requested by each of the interface units, when the request messages are received at a transmission interval less than the requested transmission interval and after the response message is transmitted to the plurality of interface units.

8. The node device of claim 1, further comprising:
a forwarding information base (FIB) table configured to store names of the request messages and corresponding interface information.

9. A method of preventing overflow of a pending interest table (PIT) in a node device, the method comprising:
counting a number of the request messages received by interface units of the node device;
detecting an interface unit receiving the request messages during a period of time among the interface units in response to the number of request messages exceeding a threshold;
transmitting a traffic control message to the detected interface unit, the traffic control message requesting a transmission interval of the request messages;
discarding request messages received at a transmission interval outside a transmission interval requested by the detected interface unit, when the request messages are received at a transmission interval less than the requested transmission interval and after the transmitting of the traffic control message.

10. The method of claim 9, further comprising:
storing the request messages in the PIT.

11. The method of claim 9, further comprising:
identifying and authenticating the node device using authentication information in the traffic control message.

12. The method of claim 11, further comprising:
configuring the traffic control message to further comprise at least one of:
hop number information comprising a number of nodes transmitting the traffic control message;
maintenance time information comprising time during which traffic control by the traffic control message is maintained; and
transmission interval information comprising the transmission interval of the request messages.

13. A computer program embodied on a non-transitory computer readable medium, the computer program being configured to control a processor to perform the method of claim 9.

* * * * *